(12) United States Patent
Vinjanampati et al.

(10) Patent No.: US 11,333,038 B2
(45) Date of Patent: May 17, 2022

(54) VIBRATION ISOLATION OF LINEAR HYDRAULIC ACTUATORS USING DUAL LOAD PATH BRACKETS

(71) Applicant: Hamilton Sundstrand Corporation, Charlotte, NC (US)

(72) Inventors: Pavan Vinjanampati, Bangalore (IN); Subrahmanyam Veerarapu, Bengaluru (IN); Vimal Tirupati, Bengaluru (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/023,907

(22) Filed: Sep. 17, 2020

(65) Prior Publication Data

US 2021/0215064 A1    Jul. 15, 2021

(30) Foreign Application Priority Data

Jan. 9, 2020   (IN) .............................. 202011001039

(51) Int. Cl.
*F01D 25/04* (2006.01)
*F01D 25/24* (2006.01)

(52) U.S. Cl.
CPC .............. *F01D 25/04* (2013.01); *F01D 25/24* (2013.01); *F05D 2220/323* (2013.01); *F05D 2230/72* (2013.01); *F05D 2260/31* (2013.01); *F05D 2260/96* (2013.01); *F05D 2300/501* (2013.01)

(58) Field of Classification Search
CPC .......... F01D 25/04; F01D 25/24; F16F 1/445; F16F 15/08; B64D 29/06; F05D 2220/323; F05D 2230/72; F05D 2260/31; F05D 2260/96; F05D 2300/501
See application file for complete search history.

(56) References Cited

U.S. PATENT DOCUMENTS

| | | | | |
|---|---|---|---|---|
| 4,082,240 A | * | 4/1978 | Heathman ................ | B64G 1/14 206/319 |
| 4,295,413 A | * | 10/1981 | Kamimura ............ | F15B 15/261 92/24 |
| 6,676,116 B2 | | 1/2004 | Edberg et al. | |
| 7,654,371 B1 | * | 2/2010 | Metz ........................ | F16F 9/56 188/300 |
| 7,900,873 B2 | * | 3/2011 | Kulesha ................ | F16F 1/3732 244/135 R |

(Continued)

OTHER PUBLICATIONS

European Search Report Issued in European Application No. 21150121. 8-1009 dated Jun. 9, 2021; 7 Pages.

*Primary Examiner* — Igor Kershteyn
(74) *Attorney, Agent, or Firm* — Cantor Colburn LLP

(57) ABSTRACT

A bracket assembly includes a first bracket arranged along a damping axis and having a clevis body, a second bracket, and a vibration isolator including an elastomeric body. The second bracket is arranged along the damping axis and has a clevis portion and a mount portion. The clevis portion slidably receives the clevis body of the first bracket. The elastomeric body is arranged axially between the first bracket and the second bracket and is fixedly arranged between the clevis portion of the second bracket and the clevis body of the first bracket through an on-axis load path and through an off-axis load path extending through the bracket assembly. Actuator arrangements and methods of damping vibrational forces are also described.

18 Claims, 5 Drawing Sheets

(56) References Cited

U.S. PATENT DOCUMENTS

| | | |
|---|---|---|
| 8,733,510 B2 | 5/2014 | Haase |
| 8,836,487 B2 | 9/2014 | Shin |
| 8,960,031 B2 | 2/2015 | Keech et al. |
| 9,828,084 B2 | 11/2017 | Golshany et al. |
| 2010/0024161 A1* | 2/2010 | Wood ...................... E05C 17/30 16/82 |
| 2015/0267724 A1 | 9/2015 | Dyer et al. |
| 2019/0186587 A1 | 6/2019 | Gandhi et al. |
| 2020/0087001 A1* | 3/2020 | Dyer ...................... B64D 29/06 |

* cited by examiner

VIBRATION ISOLATION OF LINEAR HYDRAULIC ACTUATORS USING DUAL LOAD PATH BRACKETS

CROSS-REFERENCE TO RELATED APPLICATIONS

This application claims the benefit of IN Application No. 202011001039 filed Jan. 9, 2020, the disclosure of which is incorporated herein by reference in its entirety.

BACKGROUND

The present disclosure is generally related to actuator arrangements, and more particularly to bracket assemblies of actuators employed for opening and closing cowling doors on aircraft engines with vibration isolators to limit engine vibration communicated to the actuator when the cowling doors are closed during stowed condition.

Actuators utilized to open and close cowling doors on aircraft engines commonly employ linear actuators. The linear actuator is typically fixed at opposite ends to the engine and the cowling door, generally with a bracket structure. The linear actuator typically extends to open the cowling door, such as when a service technician requires access to the engine for inspection and/or maintenance of the engine and retracts to close the cowling door once the inspection and/or maintenance event is complete. Fixation of linear actuator between the engine and the cowling door typically requires that the bracket structure rigidly fix the linear actuator at opposite ends to the engine and the cowling door, respectively.

During operation the engine and/or the cowling door can experience vibration. In such circumstance the bracket structure communicates the vibration to the linear actuator according to the damping ratio of the bracket structure. In general, these actuators have a damping ratio that drops as the input excitation levels increase, the natural frequency of the actuator also changing with the input excitation level tending to provoke a non-linear dynamic response from the linear actuator. The non-linear dynamic response can accelerate wear, limit the expected service life of the actuator, and/or require that the actuator be larger than otherwise required for the operational loads communicated by the bracket structure.

Such systems and methods have generally been acceptable for their intended purpose. However, there remains a need in the art for reduction of the vibration response on these actuators by incorporating the vibration isolation through the bracket assemblies and by improving the method of communicating loads through the bracket assembly.

BRIEF DESCRIPTION

A bracket assembly is provided. The bracket assembly includes a first bracket arranged along a damping axis and having a clevis body; a second bracket arranged along the damping axis and having a clevis portion and a mount portion, the clevis portion configured to slidably receive the clevis body of the first bracket; and a vibration isolator including an elastomeric body fixedly arranged axially between the first bracket and the second bracket, the elastomeric body fixedly arranged between the clevis portion of the second bracket and the clevis body of the first bracket through an on-axis load path and through an off-axis load path extending through the bracket assembly.

In addition to one or more of the features described above, or as an alternative, further embodiments of the bracket assembly may include an axial fastener arranged along the damping axis, the axial fastener coupling the first bracket to the second bracket.

In addition to one or more of the features described above, or as an alternative, further embodiments of the bracket assembly may include that the axial fastener extends through the elastomeric body.

In addition to one or more of the features described above, or as an alternative, further embodiments of the bracket assembly may include that the clevis body of the first bracket has a base defining a base aperture with an oblong shape therethrough, the axial fastener extending through the base aperture of the base of the clevis body.

In addition to one or more of the features described above, or as an alternative, further embodiments of the bracket assembly may include that the clevis portion of the second bracket has a platform defining a platform aperture therethrough, the axial fastener extending through the platform aperture of the platform.

In addition to one or more of the features described above, or as an alternative, further embodiments of the bracket assembly may include that the clevis body of the first bracket has a first tine and a second tine connected to one another by a base, the second tine arranged on a side of the damping axis opposite the first tine, the base of the clevis body axially overlapping the second bracket.

In addition to one or more of the features described above, or as an alternative, further embodiments of the bracket assembly may include that the first tine extends in parallel with the second tine.

In addition to one or more of the features described above, or as an alternative, further embodiments of the bracket assembly may include that the clevis portion of the second bracket has a first guide and a second guide connected by a platform, the first tine in sliding engagement with both the first guide and the second guide, the second tine in sliding engagement with the first guide and the second guide.

In addition to one or more of the features described above, or as an alternative, further embodiments of the bracket assembly may include that the second guide is arranged on a side of the damping axis opposite the first guide.

In addition to one or more of the features described above, or as an alternative, further embodiments of the bracket assembly may include that the second guide extends in parallel with the first guide.

In addition to one or more of the features described above, or as an alternative, further embodiments of the bracket assembly may include that the first tine and the second tine define therethrough a first tine aperture and a second tine aperture, and that the bracket assembly further includes a lateral fastener extending through the first tine aperture and the second tine aperture.

In addition to one or more of the features described above, or as an alternative, further embodiments of the bracket assembly may include that the mount portion of the second bracket has a plurality of legs extending axially therefrom.

In addition to one or more of the features described above, or as an alternative, further embodiments of the bracket assembly may include that the plurality of legs is distributed circumferentially about the damping axis.

In addition to one or more of the features described above, or as an alternative, further embodiments of the bracket assembly may include that the plurality of legs is arranged to seat a linear actuator in the first bracket and at an oblique angle relative to the damping axis.

In addition to one or more of the features described above, or as an alternative, further embodiments of the bracket assembly may include a linear actuator connected to the first bracket; a gas turbine engine case connected to the second bracket; and a cowling door connected to the linear actuator and coupled therethrough to the gas turbine engine case by the first bracket and the second bracket.

An actuator arrangement is also provided. The actuator arrangement includes a linear actuator having a first end and a longitudinally opposite second end; a bracket assembly as described above, the first bracket coupling the second bracket to the first end of the linear actuator; and a drive operably connected to the linear actuator and arranged to extend and retract the linear actuator.

In addition to one or more of the features described above, or as an alternative, further embodiments of the bracket assembly may include a gas turbine engine with a case, wherein the second bracket couples the linear actuator to the case of the gas turbine engine through the first bracket.

In addition to one or more of the features described above, or as an alternative, further embodiments of the actuator arrangement may include that the bracket assembly is a first bracket assembly and that that the actuator arrangement further includes a second bracket assembly as described above connected to the second end of the linear actuator, and a cowling pivotably supporting a cowling door, wherein the second bracket assembly couples the first bracket assembly to the cowling door through the linear actuator.

A method of communicating load through a bracket assembly is additionally provided. The method includes, at a bracket assembly as described above, communicating a vibrational load through an on-axis load path defined by bracket assembly; and communicating an operational load through an off-axis load path defined by the bracket assembly.

In addition to one or more of the features described above, or as an alternative, further embodiments of the method may include the on-axis load path includes the elastomeric body and that the off-axis load path excludes the elastomeric body.

Technical effects of the present disclosure include the capability to dampen linear actuators. In certain examples the present disclosure provides the capability to provide tunable damping, allowing for spacing the natural frequency of linear actuators from excitation frequencies in the linear actuator environment. In accordance with certain examples the present disclosure provides dual load paths between linear actuators and the structure supporting the linear actuator, a first of the load paths fixing an end of the linear actuator during extension, a second of the load paths fixing the end of the linear actuator during retraction, and vibrational forces communicated via a soft-mount supporting the fixed end of the linear actuator when the linear actuator is inactive. It is contemplated that the soft-mount limit (or eliminate entirely) wear of the end of the linear actuator and/or the structure supporting the linear actuator.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
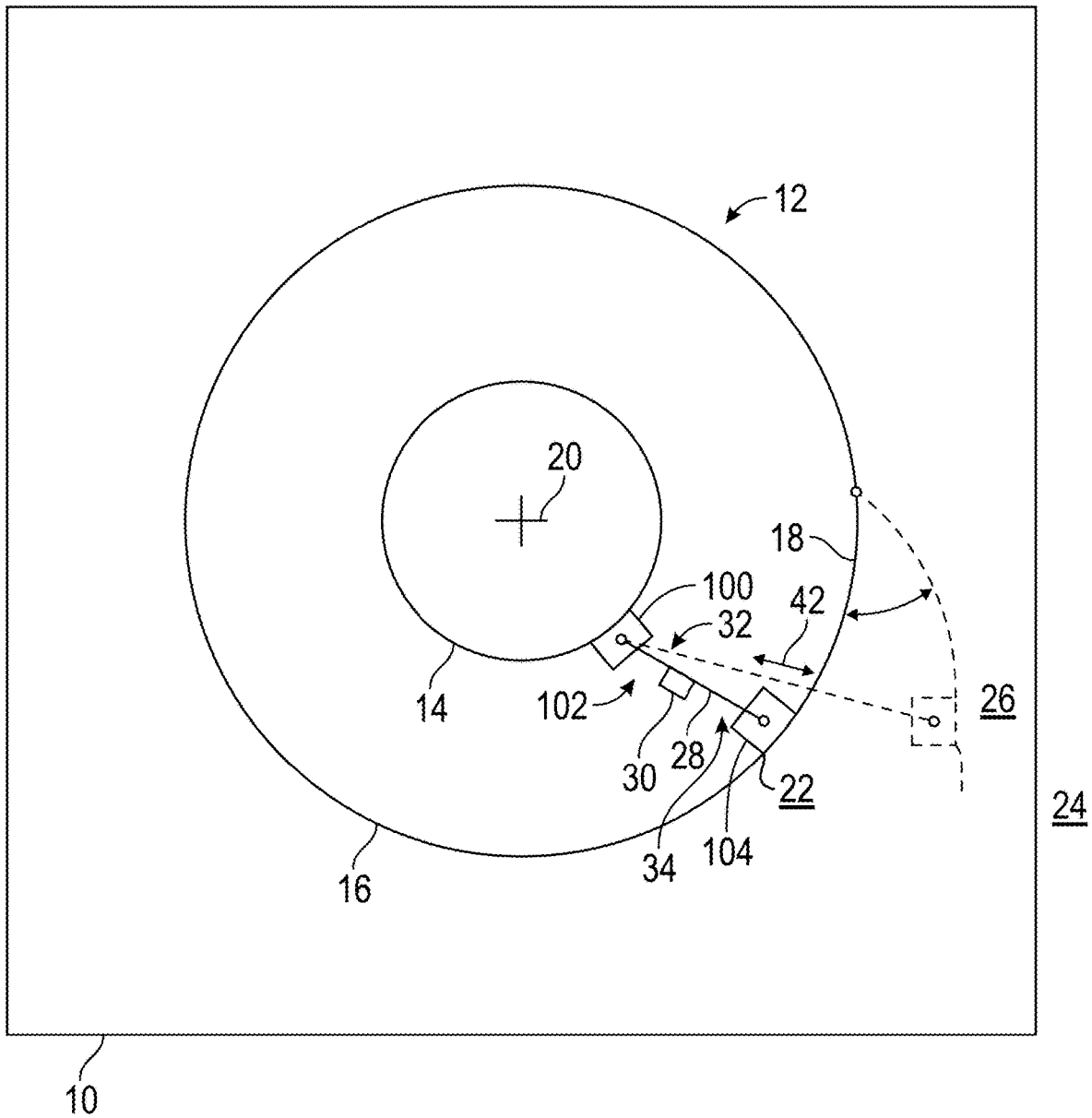
FIG. 1 is a schematic view of an actuator arrangement including a bracket assembly constructed in accordance with the present disclosure, showing the actuator arrangement moving a cowling door for a gas turbine engine between an open position and a closed position.

Reference will now be made to the drawings wherein like reference numerals identify similar structural features or aspects of the subject disclosure. For purposes of explanation and illustration, and not limitation, a partial view of an example of a bracket assembly constructed in accordance with the disclosure is shown in FIG. 1 and is designated generally by reference character 100. Other embodiments of bracket assemblies, actuator arrangements, and methods of communicating loads through bracket assemblies, are provided in FIGS. 2-7, as will be described. The systems and methods described herein can be used to provide separate load paths for vibration forces and functional forces communicated between fixed and actuated structures, such as in cowling doors on aircraft engines, though the present disclosure is not limited to cowling doors on aircraft engines or to aircraft in general.

Referring to FIG. 1, a vehicle 10, e.g., an aircraft, is shown. The vehicle 10 includes a gas turbine engine 12, e.g., an aircraft main engine. The gas turbine engine 12 includes a case 14, a cowling 16 with a cowling door 18, and an actuator arrangement 102. The case 14 extends axially along an engine axis 20. The cowling 16 encloses the case 14 and pivotably supports the cowling door 18. The cowling door 18 is movable relative to the cowling 16 between a closed position 22 (shown in solid outline), wherein the cowling door 18 separates the case 14 from the external environment 24, and an open position 26 (shown in dashed outline), wherein the case 14 is accessible from the external environment 26.

The actuator arrangement 102 includes the bracket assembly 100, a linear actuator 28, and a drive 30. The bracket assembly 100 is fixed to the case 14. The linear actuator 28 has a first end 32 and a longitudinally opposite second end 34. The first end 32 is coupled to the case 14 by the bracket assembly 100. The longitudinally opposite second end 34 is also coupled to the cowling door 18 by the bracket assembly 104. In the illustrated example the bracket assembly 100 is a first bracket assembly 100 and the actuator arrangement 102 includes a second bracket assembly 104. The second bracket assembly 104 is similar to the first bracket assembly 100 and additionally couples the second end 34 of the linear actuator 28 to the cowling door 18.

The drive 30 is operably connected to the linear actuator 28 to retract (e.g., axially shorten) and extend (e.g., axially lengthen) the linear actuator 28. As shown in solid outline, the linear actuator 28 retains the cowling door 18 in the closed position 22 when in a retracted state. As shown in dashed outline, the linear actuator 28 retains the cowling door 18 in the open position 26 when in the extended state. Retracting and extending the linear actuator 28 to displace the cowling door 18 between the closed position 22 and the open position 26 is accomplished by the drive 30, which is operably connected to the linear actuator 28. In certain examples the drive 30 is a hydraulic drive. In accordance with certain examples the drive 30 can be an electric drive.

As will be appreciated by those of skill in the art in view of the present disclosure, retracting and extending linear actuators, e.g., the linear actuator 28, generally requires that the linear actuator push (in the case of opening) or pull (in the case of opening) against the bracket structures fixing the linear actuator between the gas turbine engine case and the cowling door. This is typically accomplished by converting hydraulic energy into linear motion to extend and retract the cowling door, as appropriate. The need to pull or push against the bracket structures typically precludes employment of a soft mount directly along the force path during operation of such linear actuator. As a consequence, bracket structures typically communicate vibrational forces between the gas turbine engine case and the linear actuator and/or between cowling door and the linear actuator according to the damping ratio of the bracket structures coupling the linear actuator to the gas turbine engine case and/or the cowling door. Where the actuator supported by the bracket exhibits decreasing damping ratio in association with increasing excitation frequency the vibrational forces communicated through the bracket structure can provoke non-linear responses from the linear actuator, the linear actuator tending to ring at excitation frequencies around the natural frequency of the linear actuator and harmonics of the natural frequency. To limit (or eliminate entirely) communication of the vibrational forces to the linear actuator 28 the bracket assembly 100 is provided.

Figure 2:
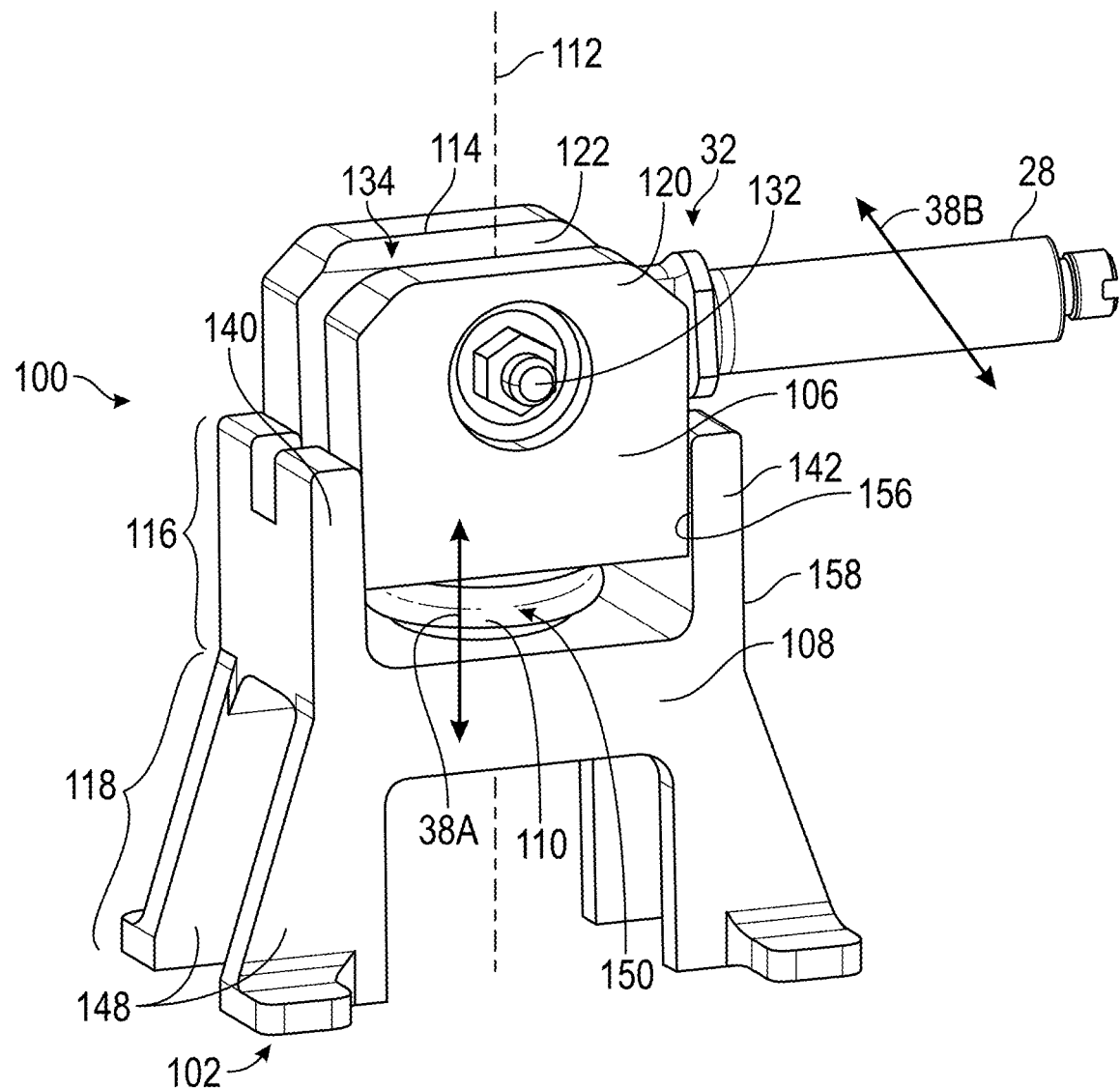
FIG. 2 is a perspective view of a portion of the actuator arrangement of FIG. 1 according to an example, showing a bracket assembly including a first bracket and a second bracket arranged along a damping axis.

With reference to FIG. 2, the bracket assembly 100 generally includes a first bracket 106, a second bracket 108, and an elastomeric body 110. The first bracket 106, the second bracket 108, and the elastomeric body 110 are arranged along a damping axis 112. The first bracket 106 has a clevis body 114. The second bracket 108 has a clevis portion 116 and a mount portion 118. The clevis portion 116 slidably receives the clevis body 114 of the first bracket 106 and the mount portion 118 is arranged to couple the bracket assembly 100 to static structure, e.g., the gas turbine engine case 14 (shown in FIG. 1). The elastomeric body 110 is arranged axially between the first bracket 106 and the second bracket 108, the elastomeric body 110 further fixedly arranged (e.g., captive) between the clevis portion 116 of the second bracket 108 and the clevis body 114 of the first bracket 106 to dampen vibrational forces 38A/38B communicated between the first bracket 106 and the second bracket 108 and/or to isolate the natural frequencies of the linear actuator 28 from vibrational excitations received from the engine over the engine operating range.

Figure 3:
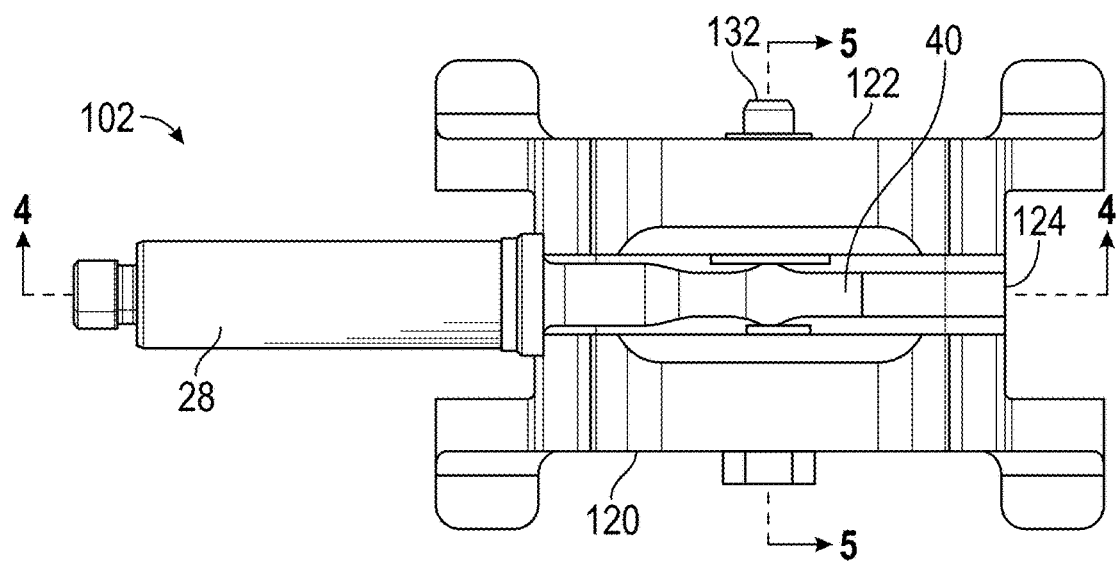
FIG. 3 is a plan view of the actuator arrangement of FIG. 1 according to the example, showing a spherical bearing coupling a linear actuator to the second bracket of the bracket assembly.
Figure 5:
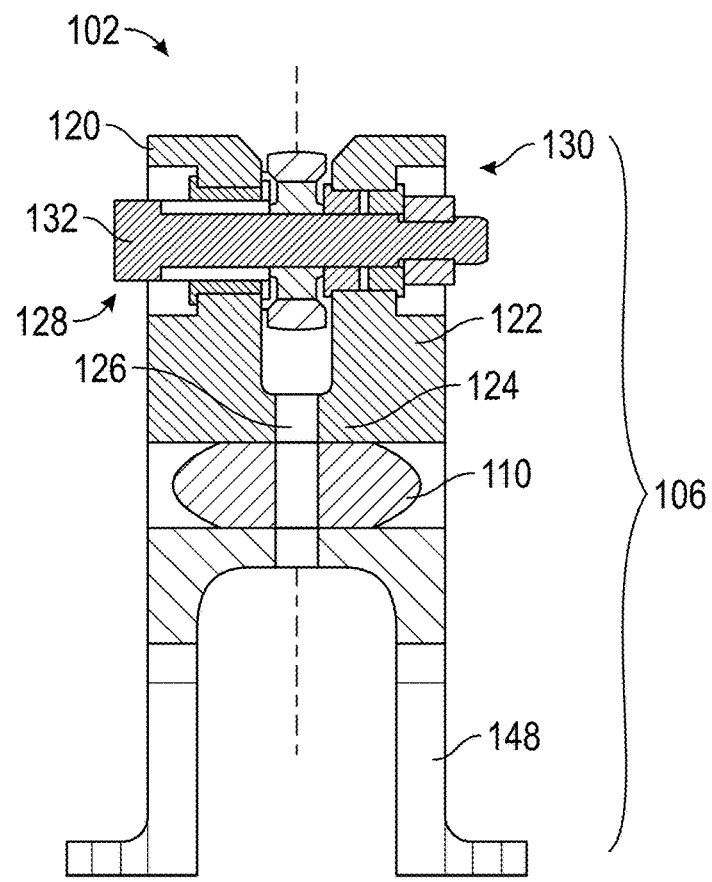
FIG. 5 is a lateral cross-sectional view of the actuator arrangement of FIG. 1 according to the example, showing a lateral fastener fixing a first end of the linear actuator to the first bracket of the bracket assembly.

With reference to FIGS. 2, 3 and 5, the clevis body 114 has a first tine 120, a second tine 122, and a base 124 (shown in FIG. 3). The base 124 laterally spans the damping axis 112 and defines therethrough a base aperture 126 (shown in FIG. 6). The first tine 120 extends axially from the base 124 and on a side of the base 124 opposite the second tine 122. The second tine 122 extends axially from the base 124 and on side of the base 124 opposite the first tine 120 and is substantially parallel to the first tine 120. The first tine 120 defines therethrough a first tine aperture 128 (shown in FIG. 5), the second tine 122 defines therethrough a second tine aperture 130 (shown in FIG. 5). A lateral fastener 132 extends through the first tine aperture 128 and the second tine aperture 130, the lateral fastener 132 extending in parallel to the base 124 of the clevis body 114 for fixation of the first end 32 of the linear actuator 28 to the bracket assembly 100.

In certain examples the first tine 120 and the second tine 122 define between one another a bearing seat 134, e.g., a spherical bearing seat, for fixation of a spherical bearing 40 (shown in FIG. 3) arranged on the first end 32 of the linear actuator 28 within the first bracket 106. The bearing seat 134 accommodates angular displacement of the linear actuator 28 relative to the bracket assembly 100 during movement of the cowling door 18 (shown in FIG. 1) between the closed position 22 (shown in FIG. 1) and the open position 26 (shown in FIG. 1). As will be appreciated by those of skill in the art in view of the present disclosure, the spherical bearing 40 accommodates out-of-plane angular displacement of the linear actuator 28 relative to the bracket assembly 100 during movement of the cowling door 18 between the closed position 22 and the open position 24.

Figure 4:
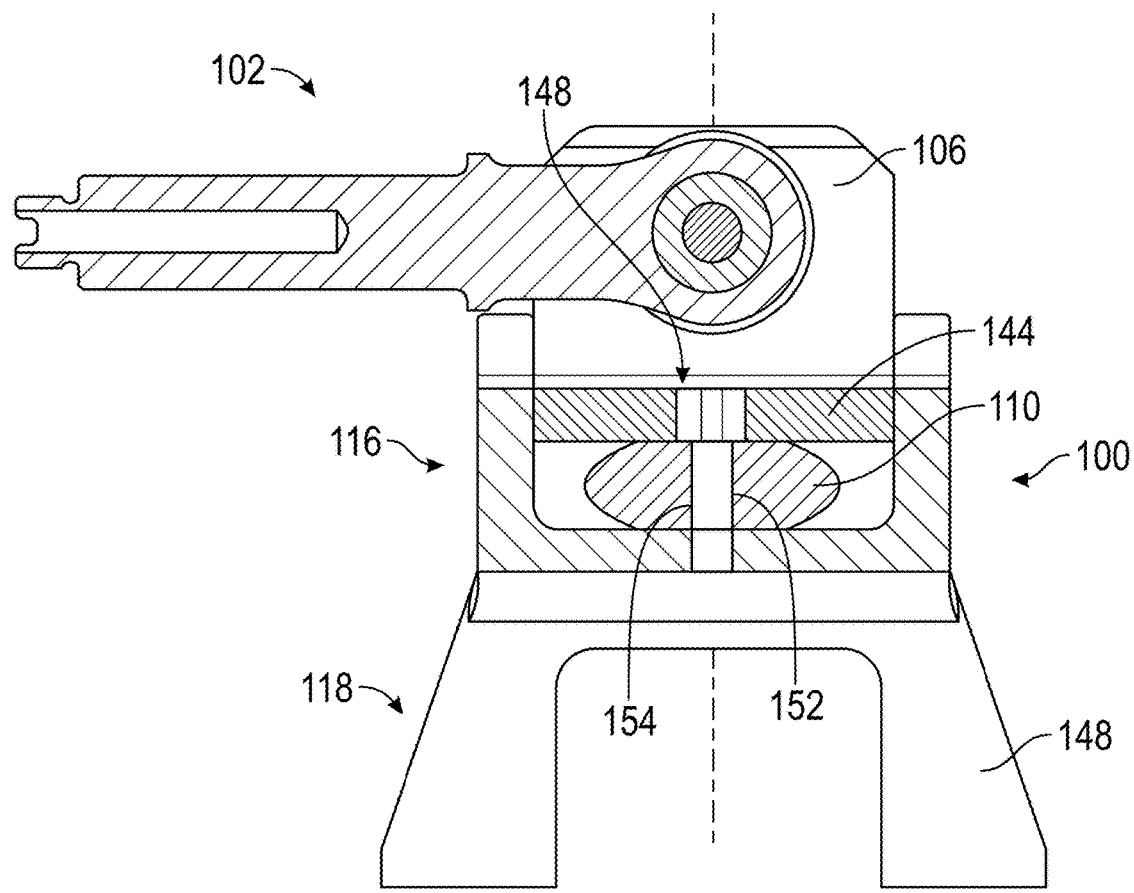
FIG. 4 is a longitudinal cross-sectional view of the actuator arrangement of FIG. 1 according to the example, showing an elastomeric body fixed between the first bracket and the second bracket of the bracket assembly.

With reference to FIGS. 2, 4 and 5, the second bracket 108 includes the clevis portion 116 and the mount portion 118. The clevis portion 116 has a first guide 140, a second guide 142, and a platform 144. The first guide 140 extends axially from the platform 144 and on side of the platform 144 opposite the second guide 142. The second guide 142 extends axially from the platform 144 and on a side of the platform 144 axially opposite the first guide 140. The platform 144 is arranged along the damping axis 112, defines therethrough a platform aperture 146, and is axially overlapped by the elastomeric body the elastomeric body 110 the first bracket 106.

The mount portion 118 has a plurality of legs 148 extending therefrom. The plurality of legs 148 extend axially in a direction opposite both the first guide 140 and the second guide 142 of the clevis portion 136 of the second bracket 108, are distributed circumferentially about the damping axis 112, and are configured for fixation of the bracket assembly 100 to the gas turbine engine case 14 (shown in FIG. 1). It is contemplated that the plurality of legs 148 orient the damping axis 112 at an angle, e.g., an oblique angle, relative to a force path through the linear actuator 28 (shown in FIG. 1) during movement of the cowling door 18 (shown in FIG. 1) between the closed position 22 (shown in FIG. 1) and the open position (shown in FIG. 1) and conform the bracket assembly 100 to an external contour of the gas turbine engine case 14 (shown in FIG. 1). In certain examples the mount portion 118 of the second bracket 108 includes four (4) legs 148. In accordance with certain examples the mount portion 118 of the second bracket 108 can have fewer than four (4) legs 148. It is also contemplated that, in accordance with certain examples, the mount portion 118 or the second bracket 108 can have more than four (4) legs.

The elastomeric body 110 is formed from a resilient or viscoelastic material 150 (shown in FIG. 2), e.g., rubber, and is arranged axially between the first bracket 106 and the second bracket 108. Furthermore, it should be noted that elastomeric body 110 is connected independently to first bracket 106 at one end and to the second bracket 108 at the other to facilitate vibration isolation. More specifically, the elastomeric body 110 is axially stacked between the base 124 of the first bracket 106 and the platform 144 of the second bracket 108, is arranged laterally between the first guide 140 and the second guide 142 of the second bracket 108 and defines therethrough an elastomeric body aperture 152. The elastomeric body aperture 152 is registered to the platform aperture 146 of the second bracket 108 and the base aperture 126 of the second bracket 108 for fixation of the elastomeric body 110 along the damping axis 112. It is contemplated that an axial fastener 154 extend through the platform aperture 146 of the second bracket 108, elastomeric body aperture 152 of the elastomeric body 110, and the base aperture 126 of the first bracket 106. This constrains axial displacement of the first bracket 106 relative to the second bracket 108 and renders the elastomeric body 110 fixedly arranged between the first bracket 106 and the second bracket 108.

The first bracket 106 is slidably received within the second bracket 108 and is clocked relative to the second bracket 108. In this respect the clevis body 114 of the first bracket 106 is clocked by 90-degrees about the damping axis 112 relative to the clevis portion 116 of the second bracket 108. So clocked, the first tine 120 and the second tine 122 of the first bracket 106 extend laterally between the first guide 140 and the second guide 142 of the second bracket 108, the first tine 120 and the second tine 122 thereby longitudinally spanning the platform 144 of the second bracket 108. It is contemplated that the longitudinal spans of the first tine 120 and the second tine 122 place longitudinal ends 156 of the first tine 120 and the second tine 122 in sliding engagement with laterally opposed faces 158 of the first guide 140 and the second guide 142. The sliding engagement of the longitudinal ends 156 of the first tine 120 and the second tine 122 with the laterally opposed faces 158 of the first guide 140 and the second guide 142 constrains displacement of the first bracket 106 relative to the second bracket 108 to axial displacement along the damping axis 112.

When one of the first bracket 106 and the second bracket 108 exerts vibrational force on the other of the first bracket 106 and the second bracket 108 the force travels primarily on-axis through the bracket assembly 100. Specifically, the base 124 of the first bracket 106 and the platform 144 (shown in FIG. 4) of the second bracket 108 communicate the vibrational force through the elastomeric body 110 and the axial fastener 154 according to the damping ratio afforded by the elastomeric body 110 and the axial fastener 154. This also isolates the natural frequency of the linear actuator 28 from excitations at (and/or around) the natural frequency of the linear actuator 28 communicated by the engine 14 and/or the cowling door 18.

When the first bracket 106 exerts operational force on the second bracket 108 associated with extension or retracting of the linear actuator 24 (shown in FIG. 1) the operational force travels off-axis, through the first tine 120 and the second tine 122 of the first bracket 106 to first guide 140 and the second guide 142 of the second bracket 108. Specifically, the operational force travels through the longitudinal ends 156 of the first tine 120 and the second tine 122 through the laterally opposed faces 158 of the first guide 140 and the second guide 142. The dual load paths, i.e., the on-axis load path for vibrational forces and the off-axis load path for operational forces, allows the bracket assembly 100 to both dampen vibrational excitation forces communicated to the linear actuator 24 via soft mounting and communicate operational loads via hard mounting.

Figure 6:
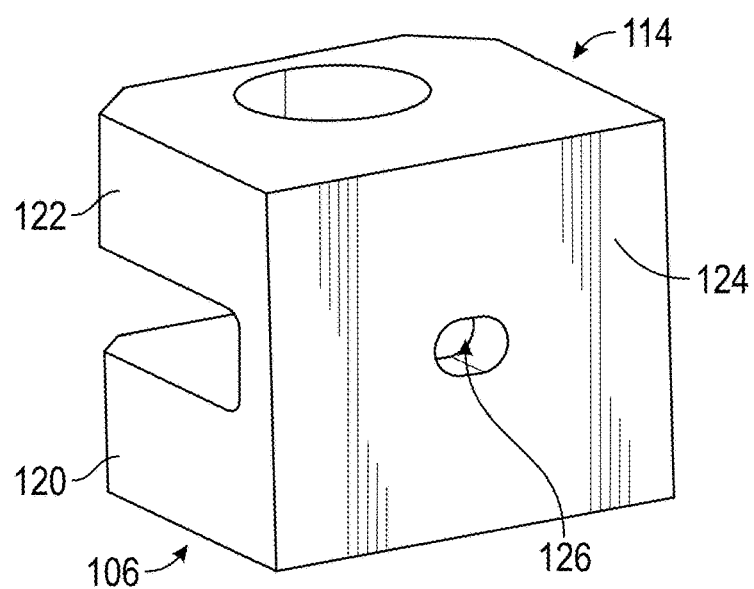
FIG. 6 is a bottom perspective view of the first bracket of the bracket assembly of FIG. 1, showing a base aperture defined therethrough with an oblong shape to provide clearance to an axial fastener extending through the elastomeric body and the first bracket.

With reference to FIG. 6, the first bracket 106 is shown. The clevis body 114 of the first bracket 106 has the first tine 120, the second tine 122 and the base 124. The base 124 laterally spans the first tine 120 and the second tine 122 and defines therethrough a base aperture 126. The base aperture 126 is sized with greater clearance between the axial fastener 154 than between first bracket 106 and the second bracket 108, e.g., clearance between the longitudinal ends 156 of the first tine 120 and the second tine 122 and bracket and the faces 158 of the second bracket 108, during off-axis loading. This allows the first bracket 106 to adjust to establish the off-axis load path for communicating loads associated with extension and/or retraction of the linear actuator 28 (shown in FIG. 1) as well off-loaded during extension/or retraction of the linear actuator 28. In the illustrated example clearance is provided by an oblong shape of the base aperture, a major axis of the base aperture extending in parallel with the first tine 120 and the second tine 122, minor axis of the oblong shape being orthogonal relative to the first tine 120 and the second tine 122. As will be appreciated by those of skill in the art in view of the present disclosure, other base aperture shapes can be employed and remain within the scope of the present disclosure.

Figure 7:
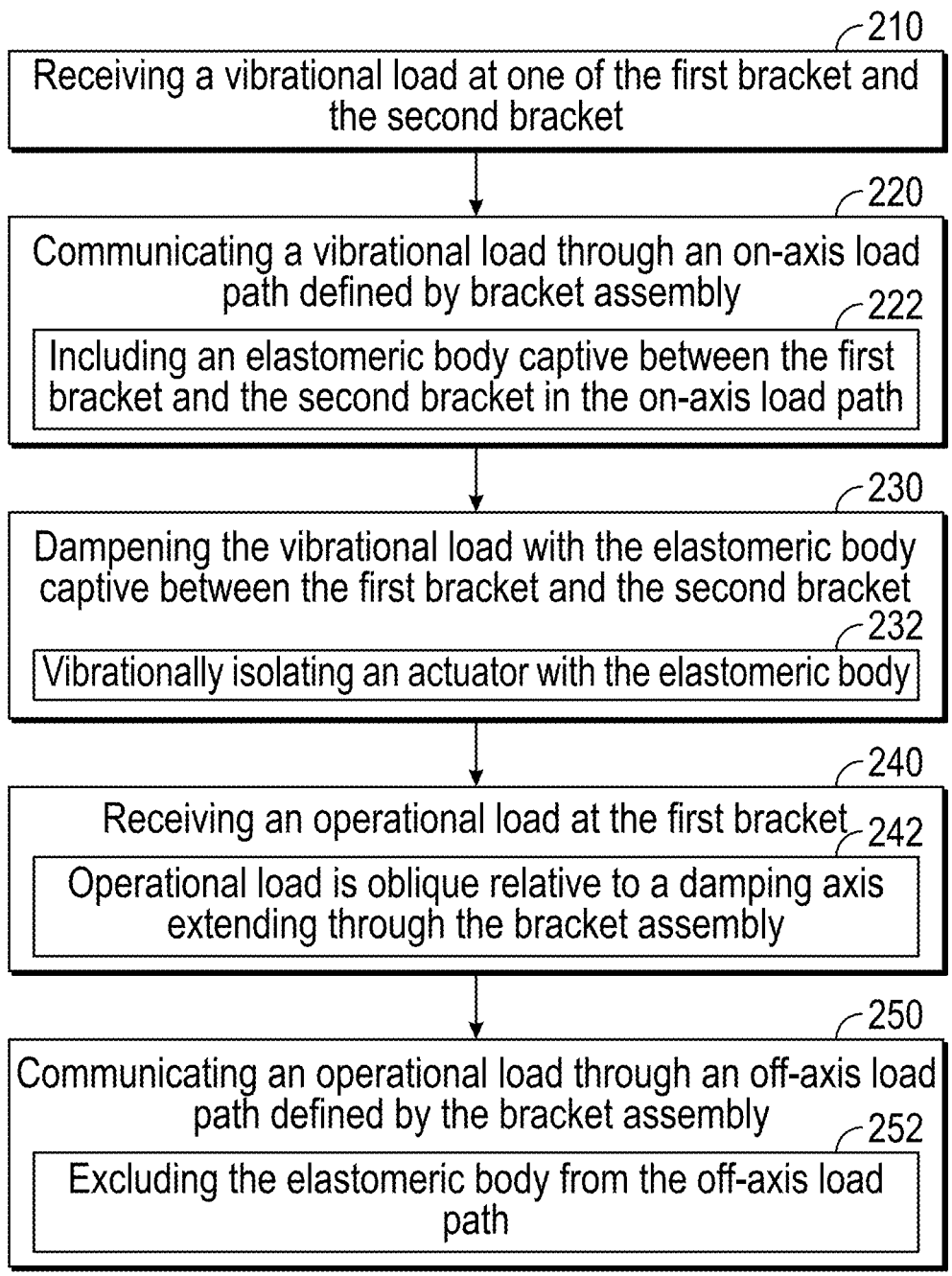
FIG. 7 is a block diagram of a method of communicating loads through the bracket assembly, showing operations of the method according to an illustrative and non-limiting example of the method.

With reference to FIG. 7, a method 200 of communicating load through a bracket assembly, e.g., the bracket assembly 100, is shown. The method 200 includes receiving a vibrational load, e.g., the vibrational forces 38A/38B (shown in FIG. 2), at least one of a first bracket and a second bracket, e.g., the first bracket 106 (shown in FIG. 2) and the second bracket 108 (shown in FIG. 2), as shown with box 210. The vibrational load is communicated through an on-axis load path defined by the bracket assembly, as shown with box 220. It is contemplated that the on-axis load path includes an elastomeric body, e.g., the elastomeric body 110 (shown in FIG. 2). It is also contemplated that the on-axis load path include a base of the first bracket, e.g., the base 124 (shown in FIG. 2), a platform of the second bracket, e.g., the platform 144 (shown in FIG. 2), and an axial fastener coupling the platform to the base, e.g., the axial fastener 154 (shown in FIG. 4), as also shown by box 222. The vibrational load communicated along the on-axis load path is dampened by the elastomeric body fixedly arranged between the first bracket and the second bracket, as shown with box 230. It is contemplated that the elastomeric body vibrationally isolation a linear actuator connected between the first bracket and the second bracket, as shown with box 232.

The method 200 also includes receiving an operational load at the first bracket, e.g., the operational load 42 (shown in FIG. 1), as shown with box 240. The operational load is communicated through an off-axis load path extending through the bracket assembly, e.g., between the first bracket and the second bracket, as shown with box 250. It is contemplated that the off-axis load path includes longitudinal ends of a first tine and a second tine of the first bracket, e.g., longitudinal ends 156 (shown in FIG. 2) of the first tine 120 (shown in FIG. 2) and the second tine 122 (shown in FIG. 2), as shown with box 252. It is also contemplated that the off-axis load path includes laterally opposed faces of a first guide and the second guide of the second bracket, e.g., the laterally opposed faces 158 (shown in FIG. 2) of the first guide 140 (shown in FIG. 2) and the second guide 142 (shown in FIG. 2), as also shown with box 254. It is additionally contemplated that communication of the operational force along the off-axis load path exclude the elastomeric body, as additionally shown with box 254. This can include exerting the operational load obliquely against the bracket assembly relative to the damping axis, as shown with 242.

Actuator assemblies, such as linear actuators employed on aircraft to open and close cowling doors, are subject to vibration during service. The linear actuator generally responds to the vibration according to the damping ratio of linear actuator installation, the damping ratio typically dropping in response to input excitation g levels. In some actuator installations the actuator can exhibit non-linear response to input vibration, accelerating wear of the actuator and potentially leading to replacement earlier than otherwise required. Such linear actuator installations have generally resisted vibration hardening, such as through soft-mounting, due to requirement that the linear actuator be able push and pull against fixed structure during cowling door opening and closure.

In embodiments described herein brackets assemblies are described that provide a first load path to the linear actuator during opening and closing of cowling door, and a second load path to the linear actuator when in the stowed condition. The first load path, e.g., an off-axis load path, provides hard mounting, allowing the linear actuator to extend and retract during opening and closing of the cowling door. The second load path, e.g., an on-axis load path, provides a soft mount to the linear actuator when the cowling door is closed, isolating the linear actuator from vibrational excitations such as from vibrational excitation communicated from the engine enclosed within the cowling during operation.

In certain examples the bracket assemblies described herein include a first bracket with a clevis body arranged along an oscillation axis, a second bracket having a clevis portion and a mount portion arranged along the oscillation axis, and an elastomeric body arranged between the clevis portion of the second bracket and the clevis body of the first bracket. The elastomeric body is fixedly arranged within the clevis portion of the second bracket dampen vibration communicated through the bracket assembly while providing dual load paths through the bracket assembly. A first of the dual load paths travel off-axis and through abutting faces of the clevis body of the first bracket and the clevis portion of the second bracket, and carries load associated with opening and closure of the cowling door transmitted through the linear actuator to the first bracket. A second of the load paths travels on-axis and through the isolator and carries vibration forces from the bracket assembly environment and dampened by the elastomeric body.

In certain examples the damping ratio of the bracket assembly can be tuned with compression of the elastomeric body, e.g., according the natural frequency of the linear actuator, limiting excitation forces at and around frequencies where the linear actuator rings, by tightness of a fastener arranged along the oscillation axis and fixing the first bracket to the second bracket. For example, vibrational excitations of frequency corresponding to the natural frequency of the linear actuator can be isolated from the linear actuator, limiting wear and/or extending service life of the linear actuator. In accordance with certain examples the bracket assembly can be relatively lightweight, the elastomeric body limiting magnitude of cyclic loading on the bracket assembly. It is also contemplated that, in accordance with certain examples, service life of the linear actuator supported by the bracket assembly can be relatively long due to a reduction in movement between the end of the linear actuator supported by the first bracket and the first bracket.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bracket assembly, comprising:
    a first bracket arranged along a damping axis and having a clevis body;
    a second bracket arranged along the damping axis and having a clevis portion and a mount portion, the clevis portion configured to slidably receive the clevis body of the first bracket;
    a vibration isolator including an elastomeric body arranged axially between the first bracket and the second bracket, wherein the elastomeric body is fixedly arranged between the clevis portion of the second bracket and the clevis body of the first bracket through an on-axis load path and through an off-axis load path extending through the bracket assembly; and
    an axial fastener arranged along the damping axis, the axial fastener coupling the first bracket to the second bracket, wherein the clevis body of the first bracket has a base defining a base aperture with an oblong shape therethrough, the axial fastener extending through the base aperture of the base of the clevis body.

2. The bracket assembly of claim 1, wherein the axial fastener extends through the elastomeric body.

3. The bracket assembly of claim 1, wherein the clevis portion of the second bracket has a platform defining a platform aperture therethrough, the axial fastener extending through the platform aperture of the platform.

4. A bracket assembly, comprising:
    a first bracket arranged along a damping axis and having a clevis body;
    a second bracket arranged along the damping axis and having a clevis portion and a mount portion, the clevis portion configured to slidably receive the clevis body of the first bracket; and
    a vibration isolator including an elastomeric body arranged axially between the first bracket and the second bracket, wherein the elastomeric body is fixedly arranged between the clevis portion of the second bracket and the clevis body of the first bracket through an on-axis load path and through an off-axis load path extending through the bracket assembly, wherein the clevis body of the first bracket has a first tine and a second tine connected to one another by a base, the second tine arranged on a side of the damping axis opposite the first tine, the base of the clevis body axially overlapping the second bracket.

5. The bracket assembly of claim 4, wherein the first tine extends in parallel with the second tine.

6. The bracket assembly of claim 4, wherein the clevis portion of the second bracket has a first guide and a second guide connected by a platform, the first tine in sliding engagement with both the first guide and the second guide, the second tine in sliding engagement with the first guide and the second guide.

7. The bracket assembly of claim 6, wherein the second guide is arranged on a side of the damping axis opposite the first guide.

8. The bracket assembly of claim 6, wherein the second guide extends in parallel with the first guide.

9. The bracket assembly of claim 4, wherein the first tine and the second tine define therethrough a first tine aperture and a second tine aperture, and further comprising a lateral fastener extending through the first tine aperture and the second tine aperture.

10. A bracket assembly, comprising:
a first bracket arranged along a damping axis and having a clevis body;
a second bracket arranged along the damping axis and having a clevis portion and a mount portion, the clevis portion configured to slidably receive the clevis body of the first bracket; and
a vibration isolator including an elastomeric body arranged axially between the first bracket and the second bracket, wherein the elastomeric body is fixedly arranged between the clevis portion of the second bracket and the clevis body of the first bracket through an on-axis load path and through an off-axis load path extending through the bracket assembly,
wherein the mount portion of the second bracket has a plurality of legs extending axially therefrom.

11. The bracket assembly of claim 10, wherein the plurality of legs is distributed circumferentially about the damping axis.

12. The bracket assembly of claim 10, wherein the plurality of legs is arranged to seat a linear actuator in the first bracket and at an oblique angle relative to the damping axis.

13. An arrangement, comprising:
a bracket assembly, including:
a first bracket arranged along a damping axis and having a clevis body;
a second bracket arranged along the damping axis and having a clevis portion and a mount portion, the clevis portion configured to slidably receive the clevis body of the first bracket; and
a vibration isolator including an elastomeric body arranged axially between the first bracket and the second bracket, wherein the elastomeric body is fixedly arranged between the clevis portion of the second bracket and the clevis body of the first bracket through an on-axis load path and through an off-axis load path extending through the bracket assembly,
wherein the arrangement further includes:
a linear actuator connected to the first bracket;
a gas turbine engine case connected to the second bracket; and
a cowling door connected to the linear actuator and coupled therethrough to the gas turbine engine case by the first bracket and the second bracket.

14. An actuator arrangement, comprising:
a linear actuator having a first end and a longitudinally opposite second end;
a bracket assembly, comprising:
a first bracket arranged along a damping axis and having a clevis body;
a second bracket arranged along the damping axis and having a clevis portion and a mount portion, the clevis portion configured to slidably receive the clevis body of the first bracket; and
a vibration isolator including an elastomeric body arranged axially between the first bracket and the second bracket, wherein the elastomeric body is fixedly arranged between the clevis portion of the second bracket and the clevis body of the first bracket through an on-axis load path and through an off-axis load path extending through the bracket assembly,
wherein the first bracket couples the second bracket to the first end of the linear actuator; and
a drive operably connected to the linear actuator and arranged to extend and retract the linear actuator.

15. The actuator arrangement of claim 14, further comprising a gas turbine engine with a case, wherein the second bracket couples the linear actuator to the case of the gas turbine engine through the first bracket.

16. The actuator arrangement of claim 14, wherein the bracket assembly is a first bracket assembly and further comprising:
a second bracket assembly connected to the second end of the linear actuator; and
a cowling pivotably supporting a cowling door, wherein the second bracket assembly couples the first bracket assembly to the cowling door through the linear actuator.

17. A method of communicating load through a bracket assembly, comprising:
at a bracket assembly including:
a first bracket arranged along a damping axis and having a clevis body;
a second bracket arranged along the damping axis and having a clevis portion and a mount portion, the clevis portion configured to slidably receive the clevis body of the first bracket; and
a vibration isolator including an elastomeric body arranged axially between the first bracket and the second bracket, wherein the elastomeric body is fixedly arranged between the clevis portion of the second bracket and the clevis body of the first bracket through an on-axis load path and through an off-axis load path extending through the bracket assembly, and one of:
an axial fastener arranged along the damping axis, the axial fastener coupling the first bracket to the second bracket, wherein the clevis body of the first bracket has a base defining a base aperture with an oblong shape therethrough, the axial fastener extending through the base aperture of the base of the clevis body;
the clevis body of the first bracket having a first tine and a second tine connected to one another by a base, the second tine arranged on a side of the damping axis opposite the first tine, the base of the clevis body axially overlapping the second bracket; and
the mount portion of the second bracket having a plurality of legs extending axially therefrom;

communicating a vibrational load through an on-axis load path defined by bracket assembly; and communicating an operational load through an off-axis load path defined by the bracket assembly.

18. The method of claim 17, wherein the on-axis load path includes the elastomeric body, wherein the off-axis load path excludes the elastomeric body.

\* \* \* \* \*